United States Patent [19]

Strumpf

[11] Patent Number: 5,293,027
[45] Date of Patent: Mar. 8, 1994

[54] ELECTRONIC WELDING CURRENT GENERATOR FOR IMPULSE ARC WELDING

[75] Inventor: Hans G. Strumpf, Reut, Fed. Rep. of Germany

[73] Assignee: UTP Schweissmaterial GmbH & Co. KG, Bad Krozingen, Fed. Rep. of Germany

[21] Appl. No.: 905,825

[22] Filed: Jun. 29, 1992

[30] Foreign Application Priority Data

Jun. 27, 1991 [DE] Fed. Rep. of Germany ....... 4121237

[51] Int. Cl.$^5$ ............................................. B23K 9/09
[52] U.S. Cl. ............................................. 219/130.51
[58] Field of Search ..................... 219/130.51, 137 PS

[56] References Cited
U.S. PATENT DOCUMENTS

| | | | |
|---|---|---|---|
| 4,409,465 | 10/1983 | Yamamoto et al. | 219/137 PS |
| 4,529,864 | 7/1985 | Bennett | 219/137 PS |
| 4,620,082 | 10/1986 | Graville et al. | 219/130.51 |
| 4,758,707 | 7/1988 | Ogilive et al. | 219/130.51 |

*Primary Examiner*—Clifford C. Shaw
*Attorney, Agent, or Firm*—Staas & Halsey

[57] ABSTRACT

An electronic welding current generator for impulse arc welding, having a power component that is controllable by electric lead parameters which are preselected by way of electronic circuits, whereby during pulsed operation (T) a higher generator pulse current ($I_p$) or a higher generator pulse voltage ($U_p$) is produced during the pulse phases ($t_p$) and a lower generator bass current ($I_G$) or generator base voltage ($U_G$) is produced during the base phases ($t_G$). On the basis of the $U_p - I_G$ modulation, the pulse voltage ($U_p$) is controlled during the pulse phases ($t_p$) and the base current ($I_G$) is controlled during the base phases ($t_G$). During the base phased ($t_G$), the base voltage is measured at selected times, the measured value (E) stored and updated after each pulse period (T), whereby the updated measured value (E) of the base voltage ($U_G$) is obtained in direct proportion to the real, active length (LL) of the arc. This updated measured value (E) is used for the overriding control of the welding process in that the measured value (E), which represents the length (LL) of the arc, is compared with a selectively adjustable nominal value (SWLL) for the length of the arc and is amplified with a series PI-controller with the goal of achieving the mentioned superior lead control.

14 Claims, 2 Drawing Sheets

ELECTRONIC WELDING CURRENT GENERATOR FOR IMPULSE ARC WELDING

BACKGROUND OF THE INVENTION

1. Field of the Invention

The invention relates to an electronic welding current generator.

2. Description of the Related Art

The real arc voltage cannot be directly measured as an actual value for the purpose of regulating the pulse voltage, since an electric contact on the arc is not possible. Therefore, in most cases, the actual voltage value is measured at the output clamps of the welding current source.

The nominal value $U_p$ of the pulse voltage is adjusted also under consideration of the other relevant parameters until the welding process runs optimally. The active arc voltage is thereby smaller than the controlled generator output voltage. The difference results from the voltage drop along the welding cables and the voltage drop at the contact nozzle.

These voltage drops increase with time due to an increase in resistance of the warming welding cables and the wear of the contact nozzle. The voltage available at the arc decreases accordingly, the arc shortens and the splatter frequency increases until complete derailment of the process.

The arc length, which has the tendency to decrease, can be manually corrected and, thus, maintained constant in the desired manner, by observing the arc length and correspondingly increasing the nominal value of the pulse voltage $U_p$. However, this method is too demanding on the operating personnel and rules itself out for reasons of cost and missing quality control.

Consequently, in practical operation, one acts according to experience. On principle, after a set number of welding cycles, the contact nozzle is replaced, just in case. Although this method is practically workable, it leads to a high nozzle consumption and to relatively long down times and, thus, to preventable, high cost.

Since with time, this, i.e., increasing detrimental voltage drop at the contact nozzle and warming of the welding cables, is only significant in the pulse voltage phase, i.e., is generated during the pulse voltage phase $t_p$, it would be appropriate to use the principle of $I_P-I_G$ modulation instead of the $U_P-I_G$ modulation, since constant currents generate constant voltage drops at the process resistor. However, since the so-called "inner control" of the $U_P-I_G$ modulation is not present, the process stability must be forced by way of pulse time control ($t_p$ control). This method without doubt prolongs nozzle life, but, as can be shown, leads to lower welding quality.

SUMMARY OF THE INVENTION

It is the object of the invention to immediately detect, in an electronic welding current generator, from the start, tendencies of arc shortening or elongation and to effectively suppress them or to regulate them to a selected length.

This object and other objects are achieved by an electronic welding current generator according to the following features:

a) on the basis of the $U_P-I_G$ modulation, the pulse voltage ($U_P$) is controlled during the pulse phases ($t_p$) and the base current ($I_G$) is controlled during the base phases ($t_G$);

b) during the base phases ($t_G$), the base voltage ($V_G$) is measured at selected times and the measured value (E) is stored and updated after each pulse (T);

c) the updated measured value (E) of the base voltage ($U_G$) is obtained in direct proportion to the real, active length (LL) of the arc;

d) the updated measured value (E) is used for an overriding control of the welding process, whereby the measured value (E), which represents the length (LL) of the arc, is compared with a selectively adjustable nominal value (SWLL) for the length of the arc.

The control deviation $\pm S_w$, which results from the updated measured value (E) and the nominal value (SWLL, $SWU_{LL}$), is loaded onto a PI-controller connected in series and is amplified to a control parameter ($\pm Y$), which may cause an increase or decrease of the process parameter such as nominal values ($U_p$, $t_p$, $t_G$), whereby the extent of interference (control factor) may be adjustable or fixed.

The invention has the salient advantage that, by controlling the arc length in both directions during the pulsed arc welding, the process stability is increased, the contact nozzle consumption is substantially decreased and the down times are reduced. In a practical experiment, the control nozzle life was increased to five times the number of welding cycles by using the invention. Also, during manual welding such as swaying in a V-joint, the arc length remains stable; in addition, the splatter frequency is much reduced. Furthermore, the deleterious effect of the welding cable resistance increase upon warming of the welding cables is prevented. According to the invention, a parameter which is directly proportional to the real acting arc length is detected, whereby, advantageously, the principle of the pulse technology with $U_P-I_G$ modulation is used. During the pulse phase ($t_p$), the pulse voltage ($U_P$) is controlled, while during the base phase ($t_G$) the base current ($I_G$) is controlled. If the generator base voltage ($U_G$) is measured at selected times during the base phase ($t_G$), stored and updated after every pulse period, a value is measured in this manner which is proportional to the arc length and which is especially well-suited for an overriding control that maintains the arc length.

The actual value "arc length" is compared to an adjustable nominal value "arc length" and the resulting control deviation $\pm S_w$ is amplified by a series PI-controller to a control parameter $\pm Y$. The nominal value thereby follows the relationship $U_{LL}=U_O+m\cdot U_{IG}$; wherein:

$U_{LL}$ = nominal arc length value;
$U_O$ = base voltage (adjustable, for example, by potentiometers to between 13 and 20 volts);
m = slope factor with adjuster, adjustable (for example, on the circuit board) from 0.02 to 0.05 and
$U_{IG}$ = guide voltage for the base current $I_G$.

A base line which relates to all process parameters may be advantageously adjusted with this control, which base line may be obtained similar to the rigid VDE (Association of German Engineers) base line.

By way of the controller output value $\pm Y$, the process parameters required in pulse technology, such as nominal values $U_p$, $t_p$, or $t_G$, may be incremented of decremented in various ways, whereby the extent of interference, i.e., the control factor, may be adjustable or fixed.

The following are examples of control types for use in accordance with the invention:

Control type "pulse voltage increase at tendency of arc shortening":

Active nominal value $U_p$=adjusted nominal value $U_p+\Delta U_p$, whereby:

$\Delta U_p=\alpha\cdot(+Y)$; the value $-Y$ is suppressed $\alpha$=extent of interference (control factor).

Control type "pulse voltage increase and pulse time increase at tendency to arc shortening":

Active nominal value $U_p$=adjusted nominal value $U_p+\Delta U_p$

Active nominal value $U_{tp}$=adjusted nominal value $U_{tp}+\Delta U_{tp}$, whereby:

$\Delta U_p=\alpha\cdot(+Y)$; the value $-Y$ is suppressed $\Delta U_{tp}=\alpha 1\cdot(+Y)$ The two mentioned control types are ideally suited for automatic welding, especially in light of the increase in contact nozzle life and for the removal of the influence of the lead cables.

Control type "pulse voltage increase at tendency of arc length shortening as well as base time increase at tendency of arc length increase":

Actual nominal value $U_p$=adjusted nominal value $U_p+\Delta U_p$

Actual nominal value $U_{tG}$=adjusted nominal value $U_{tG}+\Delta U_{tG}$, whereby:

$\Delta U_p=\alpha\cdot(+Y)$; the $-Y$ value is suppressed $\Delta U_{tG}=\alpha 2\cdot(-Y)$; the value of $+Y$ is suppressed.

This $U_p-t_G$ type of control is chiefly suited for manual welding.

Depending on the application, any one of the three above-described control types may be selected or switched on. This requires an optimally adjusted welding process, whereby an available control switch must be set to the "aqualization" position. The nominal value of the voltage "arc length" $SWU_{LL}$ is adjusted during operation of the process until the control parameter $\pm Y$ equals zero. To this end, the control parameter may be conducted to a difference display of any construction, for example, a neutral point instrument or a LED line display or the like, in order to detect positive and negative deviations from neutral. In this equalization position, the PI-controller only acts as a P controller with defined amplification and, thus, as a display amplifier. After equalization, one may switch to the desired control type; subsequently, the process parameters should be readjusted no longer. If this is necessary, for example, for another welding job, a single re-equalization is first required. This equalization may be achieved automatically (automatic neutral point equalization).

A threshold indicator may be provided for the control parameter $\pm Y$, which indicator signals to the user when the increased life is reached. The input value of the threshold indicator is preferably the arithmetic mean value of the control parameter, whereby fast control parameter changes are suppressed.

The threshold indicator is preferably in the equalization position and is stopped during the ignition phase of a welding process in order to avoid false warnings; thus, the release of the indicator is delayed. The threshold value may be adjusted by way of a coordinated potentiometer for the adjustment of the threshold value voltage $U_{GW}$.

DESCRIPTION OF THE PREFERRED EMBODIMENT

Figure 1:
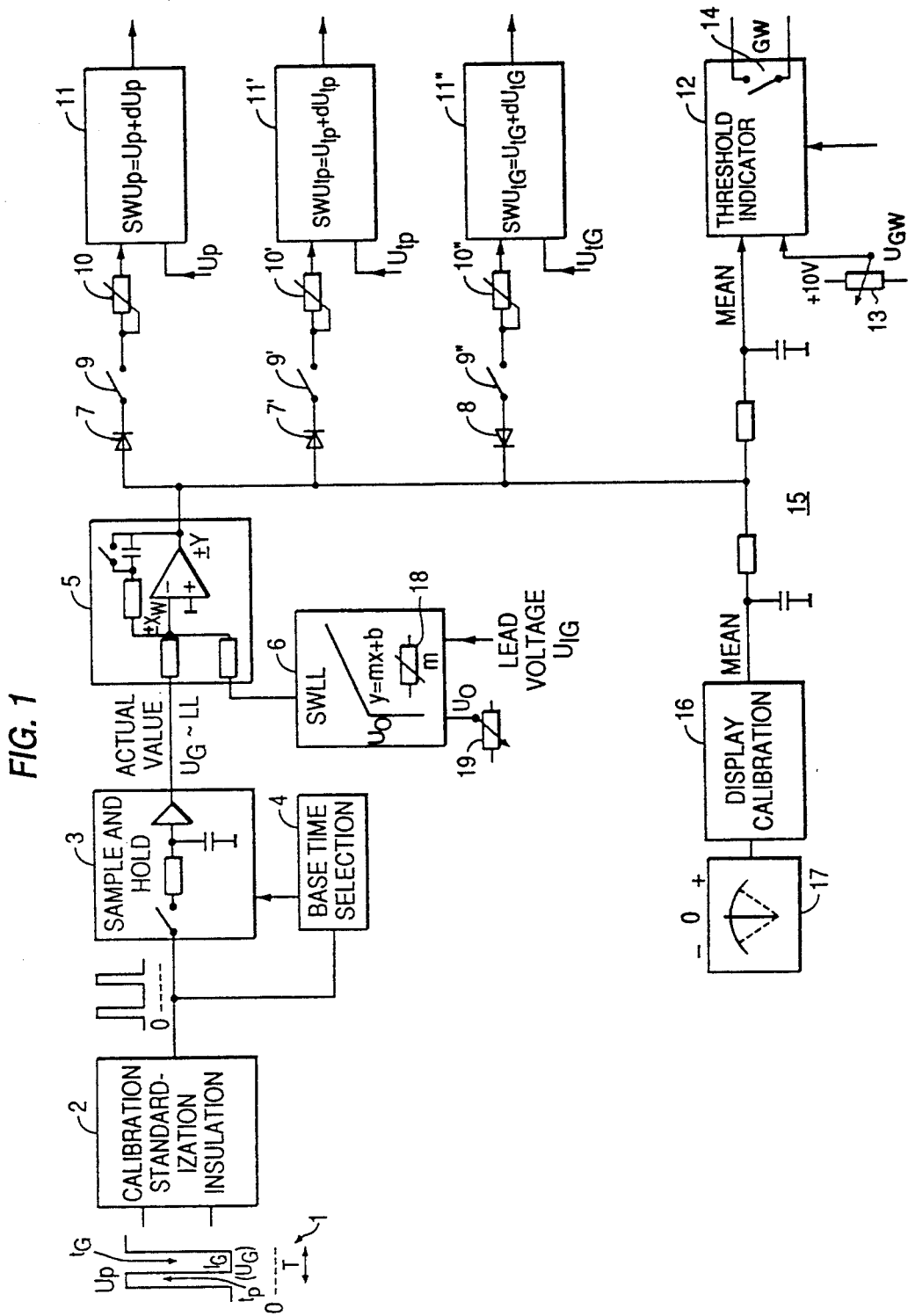
FIG. 1 shows a block circuit diagram of an electronic welding current generator according to the present invention.

A period T of a welding voltage 1 is shown in the block circuit diagram of FIG. 1 of the a welding current generator according to the present invention. During the pulse operation, a higher generator pulse voltage $U_P$ is produced during the pulse phases $t_p$ and a lower generator base voltage $U_G$ during the base phases $t_G$, whereby the base phases $t_G$ preferably have a longer duration as the pulse phases $t_p$. The welding voltage signal is loaded onto an adaptation network 2 as desired for the adaptation of the measured value and/or for the standardization and possibly for the galvanic isolation. The output signal of the network 2 is provided to a sample-and-hold circuit 3 for the detection at selected times of the straight branch of the base voltage $U_G$ of the welding voltage signal; simultaneously, the output signal of the network 2 is provided in parallel onto a component 4 for the selection and fixation of the base phase $t_G$. This component 4 provides for a delay of the sample signal when the measured voltage is sinking and for immediate shut-off of the sample signal when the measured voltage is increasing so that really only the horizontal branch of the base voltage $U_G$ is detected. The measured value obtained in this way is directly proportional to the real active length LL of the arc. The measured value E is updated by every period T of the welding voltage so that an updated measured value E proportional to the arc length LL is always available at the output of the sample and hold circuit 3. Thus, this measured value E represents the actual value of the base voltage $U_G$, which is directly proportional to the actual active arc length LL.

This measured value E (actual value $U_G$) is now compared with a selectively adjusted nominal value of the arc length SWLL, which is preferably a voltage value $SWU_{LL}$, whereby the nominal value $SWU_{LL}$ is obtained from a component 6. The nominal value of the voltage $SWU_{LL}$ follows the formula $SWU_{LL}=U_O+m\cdot U_{IG}$, whereby the slope factor m is adjustable by way of a potentiometer 18, which is multiplied with the supplied lead voltage $U_{IG}$ of the base current. The base voltage $U_o$ is adjusted by way of a potentiometer 19 of the component 6. In this way, the control deviation $\pm X_W$ is obtained at the input of a PI-controller 5 and provided to the PI-controller 5.

With this formula, a characteristic curve can be adjusted which takes into consideration all process influences, similar to the rigid VDE characteristic curve. The control deviation $\pm X_W$ is amplified to control parameter $\pm Y$ which represents the basic control parameter. With the basic control value $\pm Y$ one may now increment or decrement the process parameters required in pulse technology, such as nominal values, pulse voltage $U_p$, pulse phase $t_p$ or base phase $t_G$. The extent of intervention, which corresponds to the control factor $\alpha$, may be adjustable or rigidly set.

In the block circuit diagram of FIG. 1, the nominal value $+Y$ is provided in parallel to a switch 9 through and in the conducting direction of a diode 7 for the control type "pulse voltage increase at tendency to arc shortening", with this control type, with falling arc length, the pulse voltage is increased to such an extent that the original arc length is reached again. This control type optimizes especially the welding process.

Simultaneously, the nominal value $\pm Y$ is provided to a switch 9' through a diode 7', which is installed in the flow-through direction for the control type "pulse voltage increase and pulse time increase in view of tendency to arc length shortening", with this control type when the arc length is decreasing, the pulse voltage and, at the same time, the pulse width are increased until the original arc length is reached again.

Simultaneously, the nominal value $\pm Y$ is provided to a switch 9'' through a diode 8 which is installed in blocking direction, for generating the control type "pulse voltage increase at tendency to arc shortening and base time increase at tendency to arc lengthening". This control type increases the pulse voltage with decreasing arc length and increases the base time with increasing arc voltage and is predominantly used for the manual welding.

The switches 9, 9' and 9'' serve the adjustment or selection of the control type. A potentiometer 10, 10' and 10'' is connected before every component 11, 11' and 11'' for the adjustment of control factor $\alpha 1$ or $\alpha 2$. The components 11, 11' and 11'' are active addition networks, wherein the corresponding nominal value SW is produced by addition of the corresponding lead voltage plus the differential of this lead voltage, which nominal value is preferably a voltage, namely, one of the nominal values:

$SWU_p = U_p + dU_p$ for component 11;
$SWU_{tp} = U_{tp} + dU_{tp}$ for component 11; and
$SWU_{iG} = U_{iG} + dU_{iG}$ for component 11''.

The respective nominal value may now be used as a driving parameter in an appropriate power component.

The nominal value $\pm Y$ is similarly loaded onto a threshold indicator 12, preferably through a RC network 15, for averaging, and in parallel thereto onto a component 16 for the display equalization, the output signal of which is provided to an indicator instrument 17 which can indicate a $\pm$ deviation from neutral. The threshold indicator 12 signals to the user when the increased life due to the overriding control of the described control type is reached. Fast nominal value changes are suppressed by the forming of the arithmetic mean of the nominal value. The threshold indicator 12 is in the equalization position and blocked during the ignition phase of the welding process in order to prevent false warnings; its release is delayed. The threshold voltage $U_{GW}$ can be provided to the threshold indicator 12 through a potentiometer 13.

Figure 2:
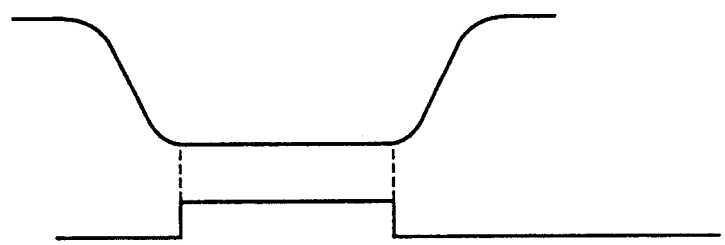
FIG. 2 shows a detection of the base voltage through sample and hold circuits of FIG. 1.

A detection of the base voltage by the sample and hold circuit 3 is illustrated in FIG. 2. The sample and hold signal is only then added to the measured voltage during the base phase $t_G$, when the base voltage $U_G$ is actually reached which means that in this manner, only the horizontal branch of the measured voltage is detected. The base voltage is stored and is available in the hold phase, preferably as a positive actual value signal, for the subsequent nominal-actual value comparison.

The nominal-actual value comparison occurs at the input of the PI-controller 5, the PI behaviour of which may be selectively preset.

Figure 3:
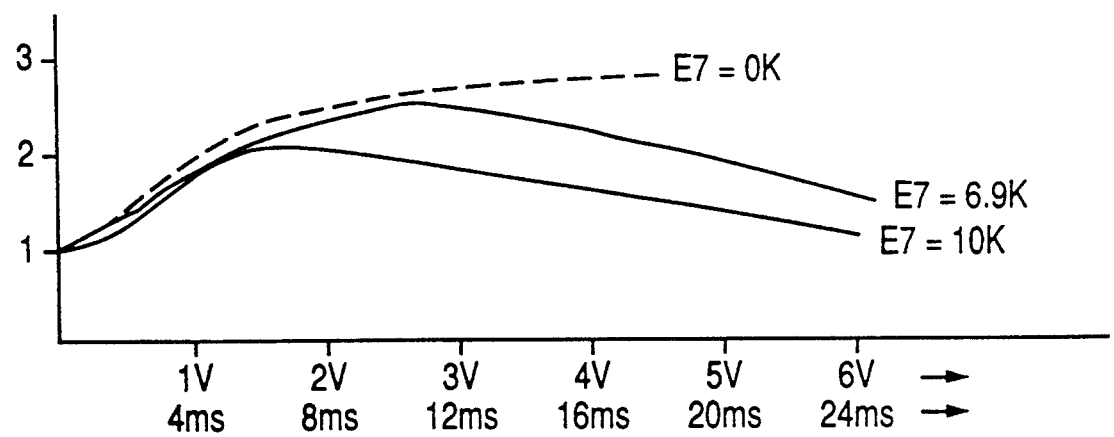
FIG. 3 shows a relationship between the control factor and the active nominal voltage value $U_P$ of the pulse phase $t_G$ with $U_P-t_G$ control.

FIG. 3 illustrates a relationship between the control factor and the base phase $t_G$ as well as the lead voltage $U_{iG}$. It is apparent therefrom that for small $t_G$ times, the controller influence is weakened, since there the so-called "inner control" is more effective, which means that the $t_p$ phase is relatively long compared to the period length T. For longer $t_G$ times, approximately from 15 milliseconds on, the controller influence becomes degressive so that the pulse frequency does not fall too low.

What is claimed is:

1. Electronic welding current generator for impulse arc welding having a power component that is controllable by electric lead parameters which are preselected by way of electronic circuits, whereby during pulsed operation a higher generator pulse current or a higher generator pulse voltage $U_p$ is produced during pulse phases and a lower generator base current $I_G$ or a lower generator base voltage is produced during base phases, comprising:

a) controlling means for, on the basis of a $U_p - I_G$ modulation, controlling the pulse voltage $U_p$ during the pulse phases and controlling the base current $I_G$ during the base phases;

b) measuring means for, during the base phases, measuring the base voltage at selected times, and storing and updating the measured value after each pulse period;

c) comparing means for comparing the measured value, which represents the real, active length of the arc, with a selectively adjustable nominal value for the length of the arc; and d) overriding means for overriding control of the welding process based on the measured value.

2. Welding current generator according to claim 1, wherein said comparing means includes a series PI-controller that receives and amplifies a control deviation based on the updated measured value and the nominal value for the length of the arc so as to provide a control value $\pm Y$ to said overriding means, said overriding means including means for incrementing or decrementing process parameters based on said control value $\pm Y$, and means for adjusting an extent of interference.

3. Welding current generator according to claim 2, wherein said overriding means includes a "pulse voltage $U_P$ increase at tendency to arc shortening" control, wherein the following applies:

active nominal value $U_P$ = adjusted nominal value $U_P + \Delta U_P$ with
   $\Delta U_P = \alpha \cdot (+Y)$
   $\alpha$ = extent of interference,
   whereby the control value $-Y$ is suppressed.

4. Welding current generator according to claim 2, wherein said overriding means includes a "pulse voltage $U_P$ increase and pulse time $U_{tP}$ increase at tendency to arc shortening" control, wherein the following applies:

active nominal value $U_P$ = adjusted nominal value $U_P + \Delta U_P$
   active nominal value $U_{tP}$ = adjusted nominal value $U_{tP} = \Delta U_{tP}$ with:
   $\Delta U_P = \alpha \cdot (+Y)$
   $\Delta U_{tP} = \alpha 1 \cdot (+Y)$
   $\alpha$ and $\alpha 1$ = extent of interference
   whereby relative to $\Delta U_P$ the control value $-Y$ is suppressed.

5. Welding current generator according to claim 2, wherein said overriding means includes a "pulse voltage $U_P$ increase at tendency to arc shortening and base time $U_{tG}$ increase at tendency of arc lengthening" control, wherein the following applies:

active nominal value $U_P$=adjusted nominal value $U_P + \Delta U_P$ active nominal value $U_{tG}$=adjusted nominal value $U_{tG} = \Delta U_{tG}$ with:

$\Delta U_P = \alpha \cdot (+Y)$ $\Delta U_{tG} = \alpha 2 \cdot (-Y)$ $\alpha$ and $\alpha 2$=extent of interference whereby relative to $\Delta U_p$ the control value $-Y$ is suppressed and relative to $\Delta U_{tG}$ the control value $+Y$ is suppressed.

6. Welding current generator according to claim 1, wherein said overriding means includes a "pulse voltage $U_p$ increase at tendency to arc shortening" control, wherein the following applies:

active nominal value $U_p$=adjusted nominal value $U_p + \Delta U_p$ with $\Delta U_P = \alpha \cdot (+Y)$ $\alpha$=extent of interference, whereby the control value $-Y$ is suppressed.

7. Welding current generator according to claim 1, wherein said overriding means includes a "pulse voltage $U_p$ increase and pulse time $U_{tP}$ increase at tendency to arc shortening" control, wherein the following applies:

active nominal value $U_p$=adjusted nominal value $U_P + \Delta U_p$ active nominal value $U_{tP}$=adjusted nominal value $U_{tP} = \Delta U_{tP}$ with:

$\Delta U_P = \alpha \cdot (+Y)$ $\Delta U_{tP} = \alpha 1 \cdot (+Y)$ $\alpha$ and $\alpha 1$=extent of interference whereby relative to $\Delta U_P$ the control value $-Y$ is suppressed.

8. Welding current generator according to claim 1, wherein said overriding means includes a "pulse voltage $U_P$ increase at tendency to arc shortening and base time $U_{tP}$ increase at tendency of arc lengthening" control, wherein the following applies:

active nominal value $U_P$=adjusted nominal value $U_P + \Delta U_P$ active nominal value $U_{tG}$=adjusted nominal value $U_{tG} = \Delta U_{tG}$ with:

$\Delta U_P = \alpha \cdot (+Y)$ $\Delta U_{tG} = \alpha 2 \cdot (-Y)$ $\alpha$ and $\alpha 2$=extent of interference whereby relative to $\Delta U_P$ the control value $-Y$ is suppressed and relative to $\Delta U_{tG}$ the control value $+Y$ is suppressed.

9. Welding current generator according to any one of claims 1, 2, 6, 7 or 8 wherein said measuring means includes a sample-and-hold circuit that detects and stores the base voltage during the base phases so that the base voltage is available in the hold-phase as an actual value signal.

10. Welding current generator according to claim 9, wherein said measuring means includes a means for delaying a sample signal at decreasing measured voltage before addition and for immediately switching off the sampled signal at increasing measured voltage, whereby only the horizontal branch of the base voltage is detected.

11. Welding current generator according to claim 9, wherein the actual value signal of the sample-and-hold circuit is provided to the input of a PI-controller as a direct measure for the real, active length of the arc, the selectively adjustable nominal value for the length of the arc also being supplied to the PI-controller, whereby the control value $\pm Y$ of the PI-controller is loaded onto a switch for the selection of a control type and that the control type is respectively made of one addition circuit to which the control value $\pm Y$, as well as the actual value, is provided and the output value of which represents the new nominal value which is provided to a corresponding power component.

12. Welding current generator according to claim 1, further comprising a threshold indicator and a display, each receiving the control value $\pm Y$, after the generation of a mean value, said display being capable of displaying a deviation from neutral in both directions.

13. Welding current generator according to claim 12, wherein the threshold indicator has an adjustable nominal threshold value and is only activated during the welding process.

14. A method for impulse arc welding having a power component that is controllable by electric lead parameters which are preselected by way of electronic circuits, whereby during pulsed operation a higher generator pulse current or a higher generator pulse voltage $U_P$ is produced during pulse phases and a lower generator base current $I_G$ or a lower generator base voltage is produced during base phases, said method comprising the steps of:

a) controlling the pulse voltage $U_P$ during the pulse phases and controlling the base current $I_G$ during the base phases, so as to perform a $U_p - I_G$ modulation;

b) measuring, during the base phases, the base voltage at selected times, and storing and updating the measured value after each pulse period;

c) comparing the measured value, which represents the real, active length of the arc, with a selectively adjustable nominal value for the length of the arc; and d) overriding control of the welding process based on the measured value.

* * * * *